United States Patent [19]
Limberg et al.

[11] Patent Number: 6,118,495
[45] Date of Patent: Sep. 12, 2000

[54] TRAINING SIGNAL IN PLURAL PN SEQUENCES NEAR BEGINNINGS OF DATA SEGMENTS OF DTV SIGNAL OR SCAN LINES OF NTSC SIGNAL

[75] Inventors: Allen LeRoy Limberg, Vienna, Va.; Chandrakant B. Patel, Hopewell, N.J.

[73] Assignee: SamSung Electronics Co., Ltd., Suwon, Rep. of Korea

[21] Appl. No.: 09/218,015

[22] Filed: Dec. 22, 1998

Related U.S. Application Data

[60] Provisional application No. 60/071,288, Jan. 13, 1998, provisional application No. 60/097,609, Aug. 24, 1998, and provisional application No. 60/105,814, Oct. 27, 1998.

[51] Int. Cl.[7] .................................................. H04N 5/213
[52] U.S. Cl. .......................................... 348/614; 348/914
[58] Field of Search .................................... 348/614, 914, 348/607; 375/232, 350, 346, 348; H04N 5/21, 5/213

[56] References Cited

U.S. PATENT DOCUMENTS 5,886,748  3/1999  Lee .......................................... 348/614

OTHER PUBLICATIONS

C. M. Zhao, X.Y. Hu and X.H. Yu, "Block Sequential Least Squares Decision Feedback Equalization Algorithm with Application to Terrestrial HDTV Transmission", Sep. 1998, IEEE Transactions on Broadcasting, vol. 44, No. 3.

*Primary Examiner*—Sherrie Hsia
*Attorney, Agent, or Firm*—Robert E. Bushnell, Esq.

[57] ABSTRACT

Training signal for channel equalization is located in the initial data segment of each DTV data field and in the nineteenth scan line of each NTSC field. Arranging for training signal separated from plural PN sequences near the beginnings of the initial data segments of DTV data fields improves post-ghost detection capability in the DTV system. In receivers for receiving NTSC signals and DTV signals, arranging for training signal to be separated from plural PN sequences near the beginnings of the nineteenth scan line of each NTSC field facilitates the same ghost-cancellation and channel-equalization filtering being used both during the reception of NTSC signals and during the reception of DTV signals.

15 Claims, 5 Drawing Sheets

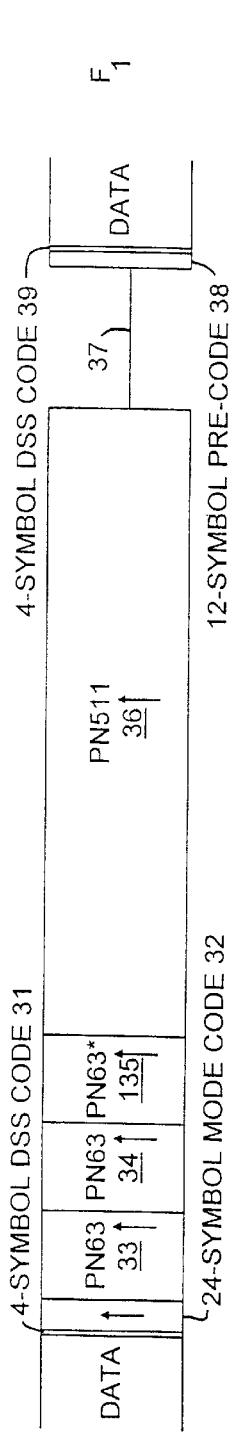
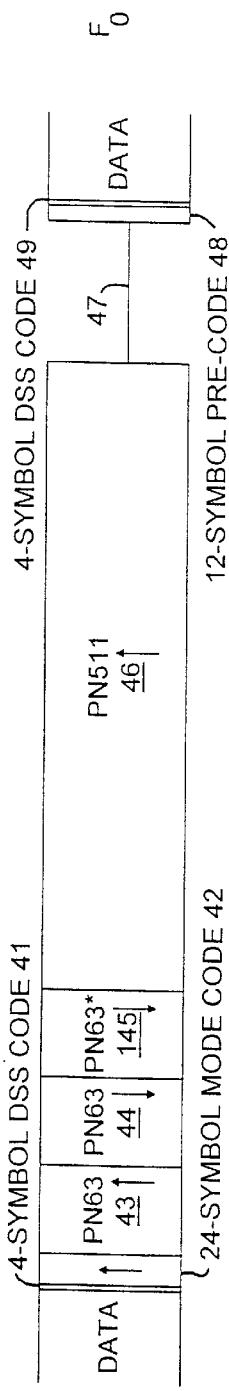
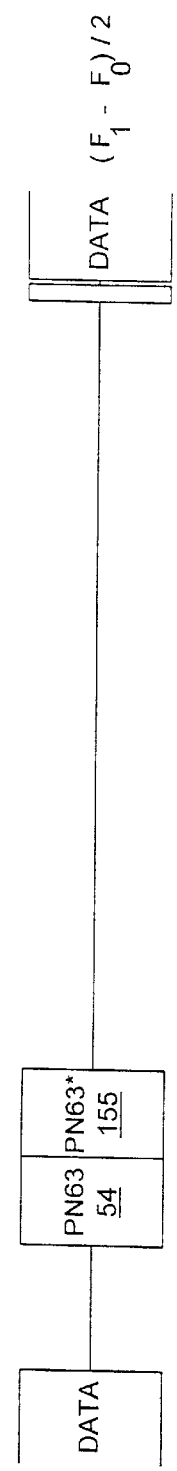
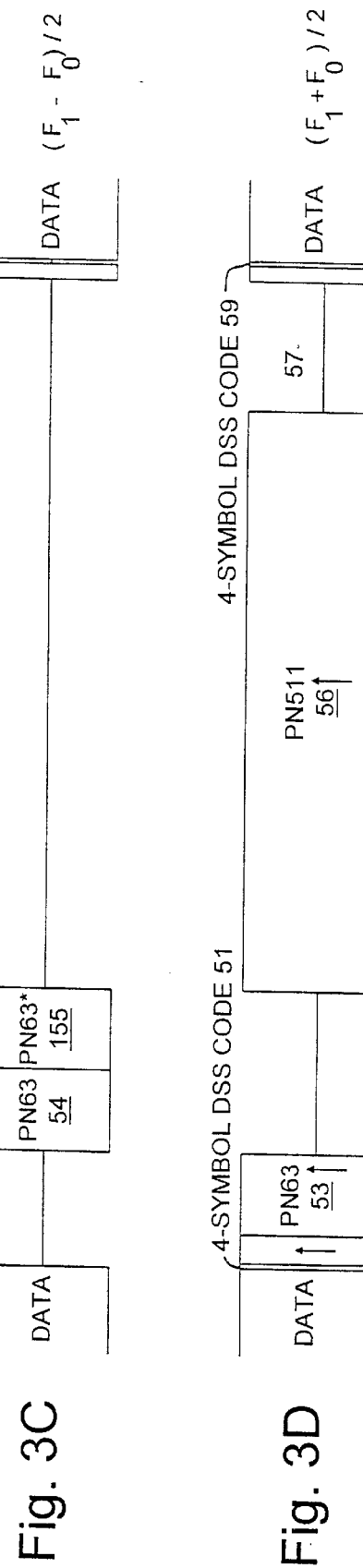
Fig. 3A
Fig. 3B
Fig. 3C
Fig. 3D

TRAINING SIGNAL IN PLURAL PN SEQUENCES NEAR BEGINNINGS OF DATA SEGMENTS OF DTV SIGNAL OR SCAN LINES OF NTSC SIGNAL

This application is filed under 35 U.S.C. 111(a) claiming pursuant to 35 U.S.C. 119(e)(1) benefit of the filing dates of the following provisional patent applications filed pursuant to 35 U.S.C. 111(b):

Ser. No. 60/071,288 filed Jan. 13, 1998;

Ser. No. 60/097,609 filed Aug. 24, 1998; and

Ser. No. 60/105,814 filed Oct. 27, 1998.

The invention relates to ghost-cancellation circuitry in television receivers and to reference signals included in transmitted television signals for facilitating such ghost-cancellation.

BACKGROUND OF THE INVENTION

The visual effects of multipath distortion upon analog television signals can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. Macroghosts are more common in over-the-air terrestrial broadcasts than in cablecasting. Long-delay multipath effects, or macroghosts, are typically reduced by cancellation schemes.

In the usual case in which the direct signal predominates and the receiver is synchronized to the direct signal, the ghost images are displaced to the right at varying position, intensity and polarity. These are known as trailing ghosts or "post-ghost" images. Typically, the range for post-ghosts extends to 40 microseconds displacement from the "principal" signal, with 70% or so of post-ghosts occurring in a sub-range that extends to 10 microseconds displacement.

In the less frequently encountered case where the receiver synchronizes to a reflected signal, there will be one or more ghost images displaced to the left of the reference image. These are known as leading ghosts or "pre-ghost" images. Pre-ghosts occurring in off-the-air reception can be displaced as much as 6 microseconds from the "principal" signal, but typically displacements are no more than 2 microseconds.

Multipath signals delayed relatively little with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "micro-ghosts", and they can accumulate to cause significant distortion. Short-delay multipath effects, or microghosts, are typically alleviated by waveform equalization, generally by peaking and/or group-delay compensation of the video frequency response.

In September 1995 the Advanced Television Systems Committee (ATSC) published a standard for digital high-definition television (HDTV) signals that has been accepted as the defacto standard for terrestrial broadcasting of digital television (DTV) signals in the United States of America. The standard will accommodate the transmission of DTV formats other than HDTV formats, such as the parallel transmission of four television signals having normal definition in comparison to an NTSC analog television signal. The standard uses vestigial-sideband (VSB) amplitude modulation (AM) to transmit the DTV signals, designed for transmission through 6-Mz-bandwidth ultra-high-frequency (UHF) channels that correspond to channels currently used for analog television transmission.

DTV transmitted by VSB AM during terrestrial broadcasting in the United States of America comprises a succession of consecutive-in-time data fields each containing 313 consecutive-in-time data segments or data lines. Each segment of data is preceded by a data segment synchronization (DSS) code group of four symbols having successive values of +S, −S, −S and +S. The value +S is one level below the maximum positive data excursion, and the value −S is one level above the maximum negative data excursion. The segments of data are each of 77.3 microsecond duration, and there are 832 symbols per data segment for a symbol rate of about 10.76 million bauds or symbols per second. The initial line of each data field is a data field synchronization (DFS) code group that codes a training signal for channel-equalization and multipath suppression procedures. The remaining lines of each data field contain data that have been Reed-Solomon forward error-correction coded. In over-the-air broadcasting the error-correction coded data are then trellis coded using twelve interleaved trellis codes, each a ⅔rate punctured trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as sixteen-level one-dimensional-constellation symbol coding, which transmissions are made without precoding.

The carrier frequency of a VSB DTV signal is 310 kHz above the lower limit frequency of the TV channel. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of −7, −5, −3, −1, +1, +3, +5 and +7 in the carrier modulating signal exclusive of pilot carrier, the pilot carrier has a normalized value of 1.25. The normalized value of +S is +5, and the normalized value of −S is −5.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the last transmitted good TV images, such masking being less satisfactory if the TV images contain considerable motion content. The catastrophic failure in the television image is accompanied by loss of sound.

The training signal or ghost-cancellation reference (GCR) signal in the initial line of each data field of an ATSC-standard DTV signal is a 511-sample pseudo-random noise sequence (or "PN sequence") followed by three 63-sample PN sequences. A 511-sample PN sequence is referred to as a "PN511 sequence" and a 63-sample PN sequence is referred to as a "PN63 sequence". The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other. This training signal has not worked well in practice, however, and cannot be incorporated in its entirety into an NTSC television signal.

The middle PN63 sequence of the ATSC field synchronization code, as separated by differentially combining corresponding samples of successive field synchronization code sequences, can be used as a basis for detecting ghosts. Pre-ghosts of up to 53.701 microseconds (4+511+63=578 symbol epochs) before the separated middle PN63 sequence can be detected in a discrete Fourier transform (DFT) procedure without have to discriminate against data in the last data segment of the preceding data field. However, the post-ghosts of such data can extend up to forty microseconds into the first data segments and add to the background clutter that has to be discriminated against when detecting pre-ghosts of the separated middle PN63 sequence. Post-ghosts of up to 17.746 microseconds (63+104+24=191 symbol epochs) after the separated middle PN63 sequence can be detected in a discrete Fourier transform (DFT) procedure without have to discriminate against data in the precode and in the data segment of the succeeding data field. Longer-delayed post-ghosts have to be detected while discriminating against background clutter that includes data. The autocorrelation properties of the PN63 sequence are not so great that detection of longer-delayed post-ghosts may be sufficiently sensitive. The middle PN63 sequence of the ATSC field synchronization code provides more pre-ghost canceling capability than required in practice, but insufficient post-ghost canceling capability. Post-ghosts delayed up to forty microseconds after principal signal occur in actual practice. However, pre-ghosts preceding the principal signal by more than four microseconds are rare, according to page 3 of the T3S5 *Report Ghost Canceling Reference Signals* published Mar. 20, 1992 by the ATSC.

If one seeks to exploit the autocorrelation properties of the PN511 sequence in the ATSC DTV signal for selection of ghosts in a DFT procedure, the selection filter has to discriminate PN511 sequence and its ghosts from background clutter that includes data and the initial and final PN63 sequences. This background clutter has substantial energy, so weaker ghosts of the PN511 sequence are difficult to detect. The higher energy response of the PN511 autocorrelation filter used for ghost detection cannot be fully exploited because data and the initial and final PN63 sequences increase so much the energy of the background clutter that the filter is to discriminate against.

The current de facto standard for ghost-cancellation reference (GCR) signal in an analog television signal transmitted in accordance with the National Television System Committee (NTSC) standard is as follows. A Bessel chirp is transmitted in the nineteenth vertical-blanking-interval (VBI) horizontal scan line of each field. The cost of ghost-cancellation circuitry is quite high, somewhat over $100 in the retail price of a receiver, so few analog TV receivers with ghost-cancellation circuitry have been commercially manufactured. The inventors believe that television receivers capable of receiving either DTV or NTSC signals, referred to in this document as "NTSC/DTV receivers", will be the norm during a period of transition from NTSC TV broadcasting to DTV broadcasting. Ghost-cancellation and equalization circuitry is a practical necessity in the DTV portion of the TV receiver. Accordingly, the inventors point out, it can be economical to use at least part of that same ghost-cancellation and equalization circuitry to suppress ghosts in the NTSC portion of the TV receiver.

This dual usage of the same ghost-cancellation and equalization circuitry is furthered by the nineteenth VBI scan line of each field including a GCR signal similar to that used in the DTV signal rather than the Bessel chirp that is the current standard. The use of a similar GCR signal during DTV transmission and during NTSC transmission, rather than using different GCR signals, expedites using the same microcomputer program to calculate weighting coefficients for the ghost-cancellation and equalization filters during the reception of each type of transmission. The desirability of using a similar GCR signal during DTV transmission and during NTSC transmission, in order to reduce hardware in an NTSC/DTV receiver, has not been previously recognized, insofar as the inventors are aware.

The inventors observe that the $10.76 \cdot 10^6$ baud rate of DTV using the ATSC standard and the 3.58 MHz color subcarrier frequency of NTSC TV have harmonics that are close in frequency, facilitating the construction of a sampling clock generator for the digital filtering used in the ghost-cancellation and equalization circuitry, which sampling clock generator is susceptible of receiving automatic frequency and phase control (AFPC) signal either from the 3.58 MHz color subcarrier frequency regenerated during NTSC TV reception or from the baud rate information extracted during DTV reception.

SUMMARY OF THE INVENTION

The invention is embodied in an electrical signal received by a television signal receiver, which is of a type for receiving digital television signals and has adaptive channel equalization and ghost cancellation filter circuitry that can be trained responsive to a ghost cancellation reference (GCR) signal. The electrical signal is divided into segments having respective initial synchronizing signal portions, with the segments being grouped into fields. Most of the segments of each field are available for transmitting television information, with a single segment of each field being reserved for other purposes including transmission of the GCR signal. The electrical signal includes a respective plurality of pseudo-random noise sequences within the first half of said reserved segment of each field. At least one pseudo-random noise sequence in each plurality of pseudo-random noise sequences appears in different polarities in different fields, for being included in the GCR signal after being separated from other information in the reserved segment of each field by algebraically combining elements of that segment with corresponding elements of at least one other reserved segment from another field. The generation of the GCR signal from pseudo-random noise sequences within the first halves of the reserved segments facilitates the adaptive channel equalization and ghost cancellation filter circuitry suppressing post-ghosts including those delayed longer than 18 microseconds.

The invention is embodied in one of its more specific aspects in a DTV signal differing from that of the ATSC standard in that the data field synchronization (DFS) code is modified so as to relocate the 24-symbol VSB-mode code immediately after the 4-symbol segment synchronization code, rather than later in the DFS code, and to relocate the three PN63 sequences immediately after the relocated VSB-mode code, to be followed by the PN511 sequence and the 104-symbol gap referred to as "reserve". This improves the ghost-separation capabilities of the separated middle PN63 sequence. Post-ghosts up to 62.992 microseconds (63+511+104=678 symbol epochs) and pre-ghosts up to −8.455 microseconds (4+24+63=91 symbol epochs) can be detected without data making substantial contribution to background clutter.

The invention is embodied in a further one of its more specific aspects in a DTV signal differing from that of the ATSC standard, not only as set forth in the preceding paragraph, but also in the following way. The trailing PN63 sequence in the initial data segment of each data field is replaced by a PN63 sequence that is orthogonal to the middle PN63 sequence and that alternates its sense of polarity from each data field to the next.

BRIEF DESCRIPTION OF THE DRAWING

FIGS. 3A and 3B are timing diagrams of DFS signals alternatively proposed in accordance with another aspect of the invention for accompanying DTV transmissions, the fields of which DTV transmissions are consecutively numbered modulo-2.

FIG. 3C is a timing diagram of a GCR signal as separated from the DFS signals of FIGS. 3A and 3D by linearly combining corresponding samples from them in a prescribed manner, which GCR signal essentially consists of two PN63 sequences that are mutually orthogonal to each other.

FIG. 3D is a timing diagram of a GCR signal as separated from portions of the DFS signals of FIGS. 3A and 3D by linearly combining corresponding samples from them in a prescribed manner, which GCR signal essentially consists of a PN511 sequence.

DETAILED DESCRIPTION

Figure 1:
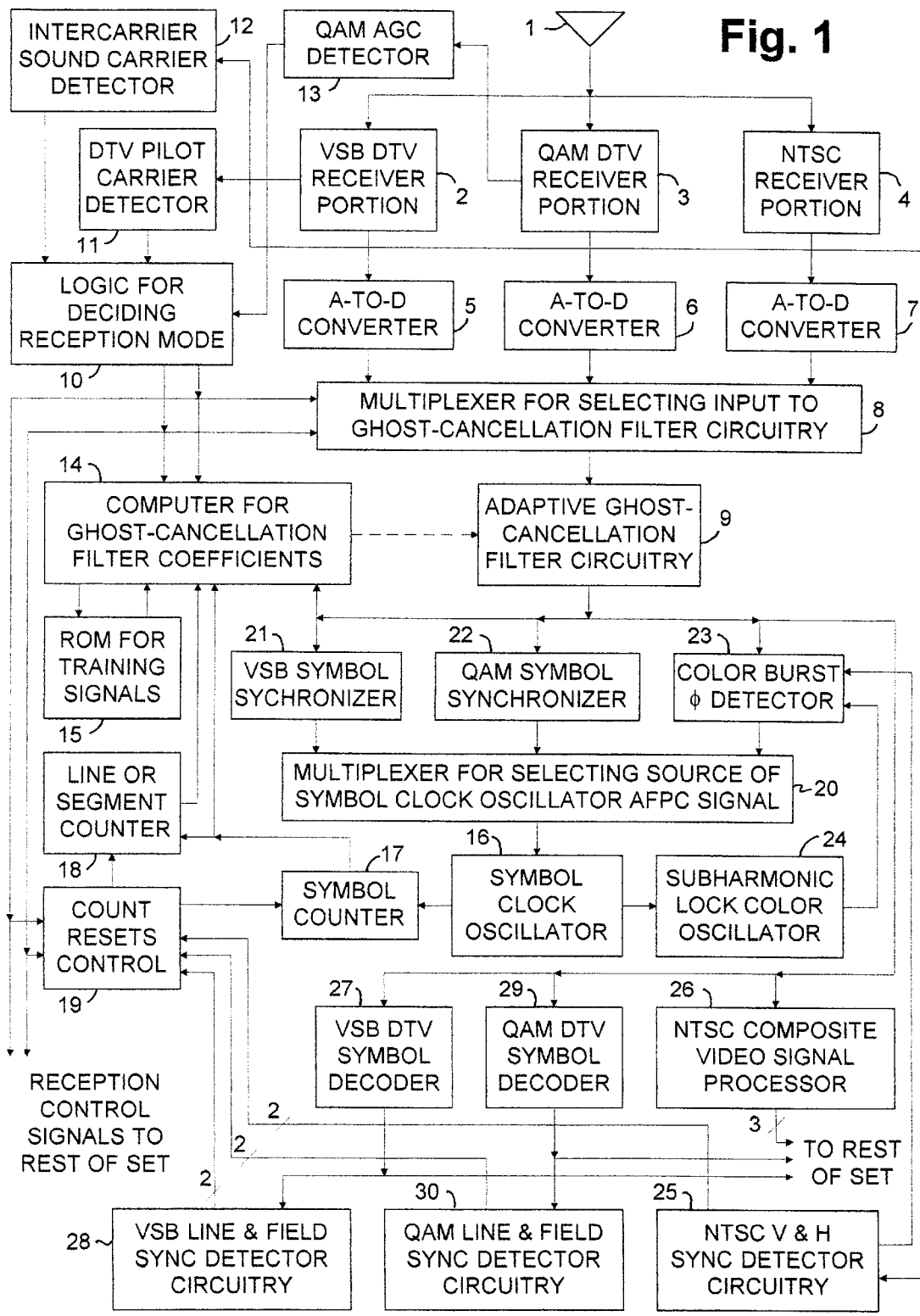
FIG. 1 is a block schematic diagram of portions of novel television signal reception apparatus for receiving NTSC analog television signals, VSB DTV signals as used in over-the-air terrestrial broadcasting and QAM DTV signals as used in cablecasting and direct satellite broadcasting, which portions include adaptive ghost-cancellation filter circuitry for use in the reception of any of these signals.

In FIG. 1 antenna 1 represents all sources of radio-frequency television signals to television signal reception apparatus comprising a VSB DTV receiver portion 2, a QAM DTV receiver portion 3, and an NTSC receiver portion 4. By way of examples, this TV signal reception apparatus may be included in a television set with a viewing screen and apparatus responsive to received baseband signals for creating images on the viewscreen, or this television signal reception apparatus may be included in a digital video recording apparatus. These receiver portions 2–4 preferably share a first mixer and may share intermediate-frequency amplifier circuitry and possibly a further mixer. Various arrangements of this type are described by A. L. R. Limberg in U.S. patent application Ser. No. 08/820,193 filed Mar. 19, 1997 and entitled "DIGITAL-AND-ANALOG-TV-SIGNAL RECEIVERS, EACH WITH SINGLE FIRST DETECTOR AND SHARED HIGH-BAND I-F AMPLIFICATION"; in U.S. patent application Ser. No. 08/825,711 filed Mar. 19 1997, U.S. Pat. No. 5,982,457, and entitled "RADIO RECEIVER DETECTING DIGITAL AND ANALOG TELEVISION RADIO-FREQUENCY SIGNALS WITH SINGLE FIRST DETECTOR"; and in a similarly titled U.S. patent application Ser. No. 09/003,513 filed Jan. 6, 1998.

In FIG. 1 the VSB DTV receiver portion 2, the QAM DTV receiver portion 3, and the NTSC receiver portion 4 supply baseband signals to analog-to-digital converters (ADCs) 5, 6 and 7, respectively, but in practice digitization may be done before baseband detection. U.S. Pat. No. 5,479,449 entitled "DIGITAL VSB DETECTOR WITH BANDPASS PHASE TRACKER, AS FOR INCLUSION IN AN HDTV RECEIVER", which issued Dec. 26, 1995 to C. B. Patel and A. L. R. Limberg, describes a triple-conversion TV receiver for VSB DTV signals in which receiver final intermediate-frequency signals are digitized and the resulting digital IF signals are synchrodyned to baseband in the digital regime. Digitization of final intermediate-frequency signals and then synchrodyning them to baseband in the digital regime is also practical for QAM DTV signals, as described in U.S. Pat. No. 5,506,636 entitled "HDTV SIGNAL RECEIVER WITH IMAGINARY-SAMPLE-PRESENCE DETECTOR FOR QAM/VSB MODE SELECTION" and issued Apr. 9, 1996 to C. B. Patel and A. L. R. Limberg. Digitization of either VSB or QAM DTV final intermediate-frequency signals and then synchrodyning them to baseband in the digital regime is further described in U.S. Pat. No. 5,715,012 issued to C. B. Patel and A. L. R. Limberg on Feb. 3, 1998 and entitled "RADIO RECEIVERS FOR RECEIVING BOTH VSB AND QAM DIGITAL HDTV SIGNALS". Digitization of either VSB or QAM DTV final intermediate-frequency signals and then synchrodyning them to baseband in the digital regime is still further described in U.S. Pat. application Ser. No. 08/773,949 filed by C. B. Patel and A. L. R. Limberg Dec. 26, 1996 and entitled "RADIO RECEIVERS FOR RECEIVING BOTH VSB AND QAM DIGITAL HDTV SIGNALS" as a continuation-in-part of U.S. Pat. applications Ser. Nos. 08/266,753 and 08/614,471, U.S. Pat. No. 5,715,012.

A concern in the design of the NTSC receiver portion 4 is the suppression of co-channel interference from VSB DTV signals. So, the NTSC receiver portion 4 preferably is of a form like that described in detail by A. L. R. Limberg in U.S. Pat. No. 5,786,870 issued Jul. 28, 1998, entitled "NTSC VIDEO SIGNAL RECEIVERS WITH REDUCED SENSITIVITY TO INTERFERENCE FROM CO-CHANNEL DIGITAL TELEVISION SIGNALS" and incorporated herein by reference.

The digital baseband response from the QAM DTV receiver portion is formatted to time-interleave in-phase and quadrature-phase samples in one of the input signals to a multiplexer 8. In the FIG. 1 DTV receiver this interleaving is done incidentally to analog-to-digital conversion of the analog response from the QAM DTV receiver portion 3. The ADC 6 is arranged to select its input samples alternately from the analog in-phase response of the QAM DTV receiver portion 3 and from the analog quadrature-phase response of the QAM DTV receiver portion 3.

The digital baseband responses from the VSB DTV receiver portion, the QAM DTV receiver portion, and the NTSC receiver portion are applied as input signals to the multiplexer 8, which selects one of these digital baseband responses as input signal for adaptive ghost-cancellation filter circuitry 9. The adaptive ghost-cancellation filter circuitry 9 is used to filter response from a selected one of the respective digitized baseband responses of the VSB DTV receiver portion 2, the QAM DTV receiver portion 3, and the NTSC receiver portion 4. The multiplexer 8 makes this selection responsive to selection signals supplied by logic circuitry 10 used for deciding the current mode of reception from the received signal. The multiplexer 8 may comprise three banks of tri-states. When the logic circuitry 10 supplies a signal indicating the reception of a VSB DTV signal, a first of these banks of tri-states supplies the bits of the digital response of ADC 5 at low source impedances to the input port of the ghost-cancellation filter circuitry 9 as applied input signal thereto. When the logic circuitry 10 supplies a signal indicating the reception of a QAM DTV signal, a second bank of these tri-states supplies the bits of the digital response of ADC 6 at low source impedances to the input port of the ghost-cancellation filter circuitry 9. When the logic circuitry 10 supplies a signal indicating the reception of an NTSC analog TV signal, a third bank of these tri-states supplies the bits of the digital response of ADC 7 at low source impedances to the input port of the ghost-cancellation filter circuitry 9 as applied input signal thereto.

If a VSB DTV pilot signal accompanies the signal received by the FIG. 1 portion of the TV set, a DTV pilot carrier detector 11 associated with the VSB DTV receiver portion 2 responds to this condition to indicate the reception of a VSB DTV signal. The DTV pilot carrier detector 11 can be one which responds to the baseband response of the VSB DTV receiver portion 2 exhibiting a direct offset owing to synchronous detection of the pilot carrier accompanying the VSB DTV signal, for example. The logic circuitry 10 responds to this indication for conditioning the first bank of tri-states in the multiplexer 8 to apply the bits of the digital response of ADC 7 at low source impedances to the input port of the ghost-cancellation filter circuitry 9.

If an NTSC signal of substantial strength is received by the FIG. 1 portion of the TV set, an intercarrier sound carrier detector 12 associated with the NTSC receiver portion 4 responds to pronounced 4.5 MHz intercarrier generated responsive to this condition for indicating the reception of a NTSC analog TV signal. The logic circuitry 10 responds to this indication for conditioning the third bank of tri-states in the multiplexer 8 to apply the bits of the digital response of ADC 7 at low source impedances to the input port of the ghost-cancellation filter circuitry 9.

The FIG. 1 portion of the TV set is constructed so that if a QAM DTV signal of sufficient strength to be useful is received, a threshold detector 13 will respond to the development of an automatic gain control (AGC) signal in the QAM DTV receiver portion 3 of the TV set shown in part in FIG. 1. If there are no indications of VSB DTV signal reception or of NTSC analog TV signal reception from the detectors 11 and 12, but the receiver exhibits automatic gain control responsive to QAM signals being received, the logic circuitry 10 presumes that QAM DTV reception takes place and conditions the second bank of tri-states in the multiplexer 8 to apply the bits of the digital response of ADC 6 at low source impedances to the input port of the ghost-cancellation filter circuitry 9.

If the receiver does not exhibit automatic gain control or AGC responsive to QAM signals being received, the logic circuitry 10 presumes that no useful signal is being received and does not condition any of the first, second and third banks of tri-states in the multiplexer 8 to apply bits from low source impedances to the input port of the ghost-cancellation filter circuitry 9. The input port of the ghost-cancellation filter circuitry 9 can be arranged to have a null input signal during such condition.

The output port of the ghost-cancellation filter circuitry 9 supplies signal to a computer 14 used for calculating weighting coefficients for the component digital filters in the circuitry 9. As will be described in greater detail further on in this specification, during the reception of VSB DTV signal and during the reception of NTSC analog TV signal, the computer 14 will select portions of the received signal containing a ghost-cancellation reference signal on which to base calculations of initial weighting coefficients for the component digital filters in the circuitry 9. A read-only memory (ROM) 15 is associated with the computer for storing a priori knowledge of the preferred form(s) for the selected portions of the received signal as they would be were they to be received without attending ghosts. At the time of filing this application the ghost-cancellation reference signals for NTSC analog TV and for ATSC DTV differ, but in accordance with an aspect of the invention it is desirable for the ghost-cancellation reference signals for NTSC analog TV and for ATSC DTV to resemble each other so that the ROM 15 can be constructed without need for as much storage capability.

A sampling clock generator 16 generates the sampling clock signals used by the ADCs 5, 6 and 7. The rate of the sampling clock signals is preferably a multiple of the symbol rate for DTV signals, with the multiple preferably being an integral power of two. This facilitates a symbol counter 17 counting the sampling clock signals to derive a count of the number of symbols per line—that is, the number of symbols per data segment in the case of DTV signals and the arbitrary number of symbols per horizontal scan line in the case of analog TV signals. The count of the number of symbols per line is reset on the next sampling clock signal after a full count of the number of symbols per horizontal scan line is reached. A scan line or data segment counter 18 responds to full count indications from the symbol counter 17 to count the number of data segments per data field in the case of DTV signals and the number of horizontal scan lines per image field in the case of analog TV signals. This count is reset after symbol counter 17 reaches a full count of the number of symbols per horizontal scan line after the counter 18 reaches a full count of the number of data segments per data field in the case of DTV signals and the number of horizontal scan lines per image field in the case of analog TV signals. The computer 14 responds to a prescribed line count from the counter 18 to read from the ROM 15 using the symbol count from the symbol counter 17 as read addressing. A count-resets controller 19 determines for the type of TV signal currently being received what the full counts shall be for the counters 17 and 18; the count-resets controller 19 also determines the correct phasings of the symbol count and line count the counters 17 and 18 respectively provide. These counts are used by the computer 14 to govern its selection of the portions of the received signal containing GCR signal on which to base calculations of weighting coefficients for the component digital filters in the circuitry 9.

The sampling clock generator 16 contains a master clock oscillator receiving frequency and phase control (AFPC) signal from the output port of a multiplexer 20 which selects that AFPC signal from an appropriate source for the type of signal currently being received. The multiplexer 20 makes this selection responsive to the selection signals supplied by logic circuitry 10. The output port of the ghost-cancellation filter circuitry 9 supplies signal to a VSB symbol synchronizer 21 supplying a first source of AFPC signal to a first input port of the multiplexer 20, to a QAM symbol synchronizer 22 supplying a second source of AFPC signal to a second input port of the multiplexer 20, and to a color burst phase detector 23 supplying a third source of AFPC signal to a first input port of the multiplexer 20.

A local color oscillator 24 supplies the color burst phase detector 23 with color subcarrier for synchronously detecting gated color burst. The local color oscillator 24 is locked to a subharmonic of the oscillations of the master clock oscillator in the sampling clock generator 16. This can be accomplished by detecting zero crossings of the oscillations of the master clock oscillator, counting the detected zero crossings in a binary counter, and using the square wave generated as the most significant bit of the count to phase-lock the color oscillator 24. Phase locking of the color oscillator 24 can be done using injection lock or quadricorrelation procedures. NTSC vertical and horizontal sync detection circuitry 25 responds to baseband composite video signal from the NTSC receiver portion 4 of the television receiver apparatus for detecting the occurrences of horizontal sync pulses and field retrace times. These detection results are supplied to the count resets controller 19 and, when the logic circuitry 10 supplies the count resets controller 19 a signal indicating the reception of an analog TV signal, the controller 19 is conditioned to use these detection results for determining when the counters 17 and 18 are to be reset to initial count conditions. This phases the symbol and sync counts so the computer 14 can at appropriate times read from the ROM 15 a ghost-free ghost-cancellation reference signal for analog TV. The output port of the ghost-cancellation filter circuitry 9 supplies input signal to an NTSC composite video signal processor 26, which generates color signals for application to the remainder of the television receiver apparatus.

When the logic circuitry 10 supplies a signal indicating the reception of a VSB DTV signal, the multiplexer 20 is conditioned to supply the master oscillator in the sampling clock generator with AFPC signal from the VSB symbol synchronizer 21. The VSB symbol synchronizer 21 preferably includes a filter for selecting 5.38 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of a QAM DTV signal, the multiplexer 20 is conditioned to supply the master oscillator in the sampling clock generator with AFPC signal from the QAM symbol synchronizer 22. The QAM symbol synchronizer 21 preferably includes a filter for selecting 2.39 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of an NTSC analog TV signal, the multiplexer 20 is conditioned to supply the master oscillator in the sampling clock generator with AFPC signal from the color burst phase detector 21.

The output port of the ghost-cancellation filter circuitry 9 supplies input signal to a VSB DTV symbol decoder 27, which generates a binary code stream for application to the remainder of the television receiver apparatus. The output port of the ghost-cancellation filter circuitry 9 also supplies input signal to circuitry 28 for detecting the occurrences of line sync codes and field sync codes. These detection results are supplied to the count resets controller 19 and, when the logic circuitry 10 supplies the count resets controller 19 a signal indicating the reception of a VSB DTV signal, the controller 19 is conditioned to use these detection results for determining when the counters 17 and 18 are to be reset to initial count conditions. This phases the symbol and sync counts so the computer 14 can at appropriate times read from the ROM 15 ghost-free ghost-cancellation reference signal for VSB DTV stored in ROM 15.

The output port of the ghost-cancellation filter circuitry 9 supplies input signal to a QAM DTV symbol decoder 29, which generates a binary code stream for application to the remainder of the television receiver apparatus. The output port of the ghost-cancellation filter circuitry 9 supplies input signal to circuitry 30 for detecting the occurrences of line sync codes and field sync codes. These detection results are supplied to the count resets controller 19 and, when the logic circuitry 10 supplies the count resets controller 19 a signal indicating the reception of a QAM DTV signal, the controller 19 is conditioned to use these detection results for determining when the counters 17 and 18 are to be reset to initial count conditions. In case that cablecast standards are developed in which the QAM includes ghost-cancellation reference signal, this will phase the symbol and sync counts so the computer 14 can read from the ROM 15 at appropriate times ghost-free ghost-cancellation reference signal for QAM DTV.

During analog TV reception AGC signal for the NTSC receiver portion 2 can be developed conventionally, in response to peak detection of horizontal sync tips. To forestall AGC lock-out, the NTSC vertical and horizontal synchronization circuitry 25 draws its input signal from the baseband response of the NTSC receiver portion 4 directly as shown in FIG. 1 or, alternatively, from that response as digitized by the ADC 7. During VSB DTV reception AGC signal for the VSB receiver portion 2 is preferably developed from the direct component of the baseband response of the VSB DTV receiver portion 2 arising from the synchronous detection of the pilot carrier, as described by C. B. Patel and A. L. R. Limberg in U.S. Pat. No. 5,636,252 entitled "AUTOMATIC GAIN CONTROL OF RADIO RECEIVER FOR RECEIVING DIGITAL HIGH-DEFINITION TELEVISION SIGNALS" issued Jun. 3, 1997. During QAM DTV reception, AGC signal is preferably developed as described by A. L. R. Limberg in U.S. Pat. No. 5,805,241 issued Sept. 8, 1998, entitled "NOISE-IMMUNE AUTOMATIC GAIN CONTROL FOR QAM RADIO RECEIVERS" and incorporated herein by reference. Alternatively, AGC signal is developed during VSB and/or QAM DTV reception by amplitude detection of modulation peaks.

A number of different arrangements of computer 14 and adaptive ghost-cancellation filter circuitry 9 elements are known to be possible; and the selection of which of these arrangements depends in certain degree upon the ghost-cancellation reference signals that are finally accepted as standard. The ghost-cancellation filter circuitry 9 that is usually preferred cascades an infinite-impulse-response (IIR) digital filter for canceling post-ghosts with substantial delay after a finite-impulse-response (FIR) digital filter for canceling post-ghosts with little delay, canceling pre-ghosts and implementing channel equalization after separately defined ghosts are substantially canceled. The IIR filter typically includes a digital subtractor supplying its difference output signal as a response of the IIR filter, receiving the response of the previous FIR filter as minuend input signal, and receiving as subtrahend input signal the IIR filter response via a recursive feedback path that includes a component FIR filter. This component FIR filter has many zero weighting coefficients in its kernel, which lends it to being designed to have a specialized construction using programmable bulk delay.

Ideally, when DTV signals are being received, the IIR filter response will switch between certain well-defined signal levels associated with respective symbol codes. The IIR filter response can be compared with that response as quantized to ones of these well-defined signal levels, for generating error signals to support decision-feedback equalization (DFE) methods of adjusting the coefficients in the kernels of the adaptive ghost-cancellation filter circuitry 9. As long as QAM DTV signals are transmitted without GCR signals, DFE methods have to be used when receiving QAM DTV signals. So-called "blind" equalization, which does not rely on a priori knowledge of the transmission channel has to be used for initial adjustment of the weighting coefficients of the ghost-cancellation filter circuitry 9 when a QAM DTV channel is first tuned to. Blind equalization is subject to stalling when the gradient-following procedure used for converging the ghost-cancellation filter circuitry 9 reach localized false minima called "saddlepoints" rather than the ultimate minimum the procedure is supposed to reach. Blind equalization is often a slow procedure when the transmission channel is badly ghosted as it is apt to be when receiving terrestrial over-the-air broadcasts. When VSB DTV signals are received, blind equalization is therefore eschewed in favor of initializing the filter coefficients of the ghost-cancellation filter circuitry 9 based on a training signal or ghost-cancellation (GCR) signal. After such initialization, DFE methods are advantageously used for adjusting the filter coefficients of the ghost-cancellation filter circuitry 9 so as to track changes in multipath reception conditions.

Decision-feedback equalization methods using a continuous least-mean-squares (LMS) weighting-coefficient-error minimization algorithm, as modified to facilitate calculation in substantially real time, are described by A. L. R. Limberg in U.S. patent application Ser. No. 08/832,674 filed Apr. 8, 1997, U.S. Pat. No. 5,901,175, and entitled "DYNAMICALLY ADAPTIVE EQUALIZER SYSTEM AND METHOD". U.S. Pat. No. 5,648,987 issued Jul. 15, 1997 to J. Yang, C. B. Patel, T. Liu and A. L. R. Limberg and entitled "RAPID-UPDATE ADAPTIVE CHANNEL-EQUALIZATION FILTERING FOR DIGITAL RADIO RECEIVERS, SUCH AS HDTV RECEIVERS" describes preferred DFE methods employing the block-LMS weighting-coefficient-error minimization algorithm method, as modified to facilitate calculation in substantially real time. C. M. Zhao, X.Y. Hu and X. H. Yu indicate in their September 1998 paper "Block Sequential Least Squares Decision Feedback Equalization Algorithm with Application to Terrestrial HDTV Transmission" appearing in *IEEE Transactions on Broadcasting*, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

It is customary to include the quantizer in the recursive feedback path of the IIR filter when DTV signals are being received and decision-feedback methods are used for adjusting the coefficients of the adaptive ghost-cancellation filter circuitry 9. NTSC analog television signals do not switch between certain well-defined signal levels and so do not lend themselves to decision-feedback methods in which the IIR filter response is compared with that response as quantized to ones of these well-defined signal levels. Any quantizer included in the recursive feedback path of the IIR filter during DTV reception is excluded from that path when NTSC analog television signals are being received.

The Bessel chirp that is the current defacto standard GCR signal in NTSC analog TV can be used for adjusting the filter coefficients of the ghost-cancellation filter circuitry 9. This requires the computer 14 to be capable of calculating weighting coefficients for the adaptive ghost-cancellation filter circuitry 9 by steps of performing discrete Fourier transform (DFT) analysis of the filter circuitry 9 response to the Bessel function, characterizing the channel by dividing the elements of the DFT response by corresponding elements of the DFT of the ghost-free Bessel chirp as subjected to lowpass filtering descriptive of ideal channel characteristics, and complementing the DFT characterizing the channel to make a current determination of the weighting coefficients of the filter circuitry 9. After initially determining the weighting coefficients of the filter circuitry 9 when a transmission channel is first received, these coefficients can be updated by comparing the current determinations of these coefficients with previous determinations to generate error signals and then accumulating fractions of these error signals into the previous determinations of these coefficients to accomplish the updating. The reader is referred to U.S. Pat. No. 5,331,416 entitled "METHODS FOR OPERATING GHOST-CANCELATION CIRCUITRY FOR TV RECEIVER OR VIDEO RECORDER", which issued Jul. 19, 1994 to C. B. Patel and J. Yang, for details concerning calculation of the weighting coefficients for the adaptive ghost-cancellation filter circuitry 9 using DFT methods.

The middle PN63 sequence included in DFS signal of the 1995 ATSC DTV standard, as separated by differentially combining corresponding samples of successive field synchronization code sequences, can be the basis for initializing the weighting coefficients of the filter circuitry 9 using DFT methods. Initializing the weighting coefficients this way avoids the problem encountered with DFE methods that the gradient-following procedure used for converging filter coefficients stalls in localized false minima called "saddle-points" rather than reaching the desired real minimum. After initializing the weighting coefficients of the filter circuitry 9 using DFT methods it can be advantageous to switch over to using DFE methods to reduce any errors that thereafter occur in weighting coefficients, since DFE methods tend better to follow rapidly varying ghosting conditions (e.g., aircraft flutter).

The apparatus of FIG. 1 will operate more effectively if certain changes are made to the ghost-cancellation reference (GCR) signals used in DTV. As noted in the "Background of the Invention" supra, the GCR signal provided by the separated middle PN63 sequence of the ATSC signal is deficient in capability for suppressing post-ghosts without need for accumulation over many data frames. This shortcoming can be avoided by relocating the triple-PN63 sequence from after the PN511 sequence to before the PN511 sequence.

Figure 2A:
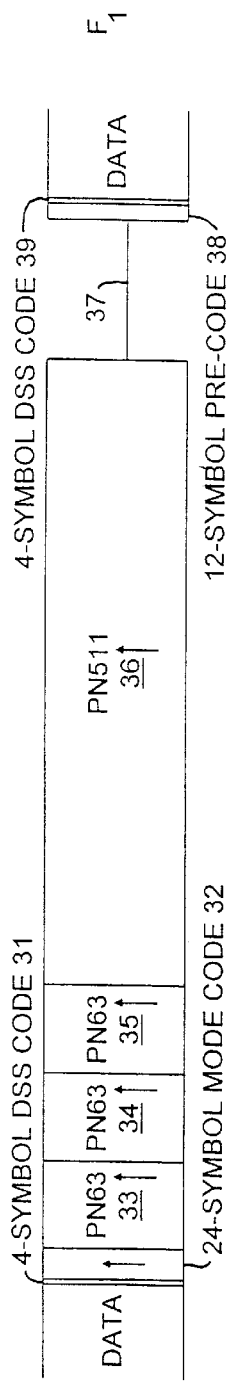
FIGS. 2A and 2B are timing diagrams of data field synchronizing (DFS) signals proposed in accordance with an aspect of the invention for accompanying DTV transmissions, the fields of which DTV transmissions are consecutively numbered modulo-2.
Figure 2B:
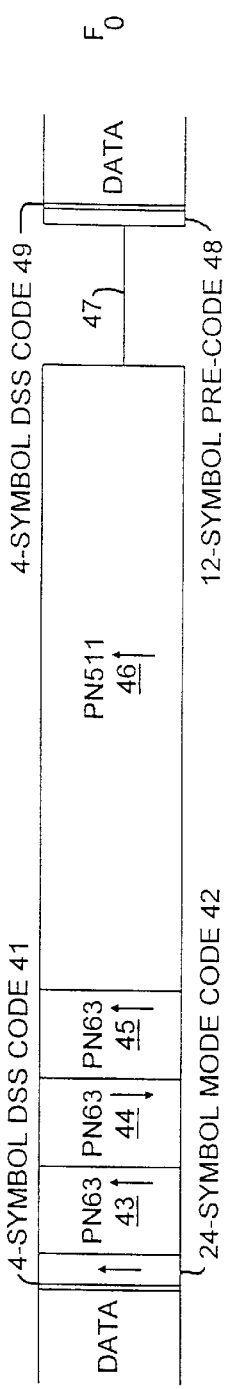

FIGS. 2A and 2B are timing diagrams of proposed modifications of the data field synchronizing (DFS) signals accompanying ATSC DTV transmissions, the fields of which DTV transmissions are consecutively numbered modulo-2. These timing diagrams and that of FIG. 2C share a common modular time scale. The DFS signal of FIG. 2A is inserted into the first data segment of the initial data field $F_1$. in each two-field data frame; and the DFS signal of FIG. 2B is inserted into the first data segment of the final data field $F_0$ in each two-field data frame. When these baseband signals are recovered in the TV signal reception apparatus, each is superposed on a direct component that arises from the synchronous detection of the pilot carrier of the ATSC broadcast signal. The arrows associated with certain ones of the code groups in FIGS. 2A and 2B is indicative of the sense of polarity of each of those code groups relative to other code groups of the same type.

The DFS signals of FIGS. 2A and 2B begin with data segment synchronization (DSS) codes 31 and 41, respectively, which DSS codes each consist of four symbols having successive values of +S, −S, −S and +S. The value +S is one level below the maximum positive data excursion, and the value −S is one level above the maximum negative data excursion. The DSS codes 31 and 41 are directly followed by respective 24-symbol mode codes 32 and 42 which are alike in the DFS signals of FIGS. 2A and 2B. The DFS signals of FIGS. 2A and 2B differ from the DFS signals of the ATSC DTV standard published in September 1995 in that the mode codes 32 and 42 are relocated from near the end of initial data segments of their respective data fields to follow directly the DSS codes 31 and 41 at the respective beginnings of those data segments.

The 24-symbol mode code 32 is directly followed by three successive similar PN63 sequences 33, 34 and 35, in turn directly followed by a PN511 sequence 36. The 24-symbol mode code 42 is directly followed by three successive PN63 sequences 43, 44 and 45, in turn directly followed by a PN511 sequence 46. The PN63 sequences 43 and 45 are similar to the PN63 sequences 33 and 35 both in amplitude and sense of polarity. The PN63 sequence 44 is similar to the PN63 sequence 34 in amplitude but is opposite from the PN63 sequence 34 in sense of polarity. This distinguishes the two data fields within a data frame and facilitates the counting of data fields and data frames. The DFS signals of FIGS. 2A and 2B differ from the DFS signals of the ATSC DTV standard published in September 1995 in that the three PN63 sequences 33, 34 and 35 directly precede rather than directly follow the PN511 sequence 36 and in that the three PN63 sequences 43, 44 and 45 directly precede rather than directly follow the PN511 sequence 46.

The PN511 sequence 36 is followed after an intervening 104-symbol-epoch interval 37 by a 12-symbol precode group 38 repeating the last twelve symbols of the preceding data field. The PN511 sequence 46 is followed after an intervening 104-symbol-epoch interval 47 by a 12-symbol precode group 48 repeating the last twelve symbols of the preceding data field. The intervals 46 and 47 are depicted in FIGS. 2A and 2B as being free of signal except for the direct component that arises from the synchronous detection of the pilot carrier of the ATSC broadcast signal. Alternatively, these intervals may be filled by respective groups of symbols, which groups within the same data frame are alike in their content. The DFS signals of FIGS. 2A and 2B end immediately after precode groups 38 and 48, respectively.

Figure 2C:
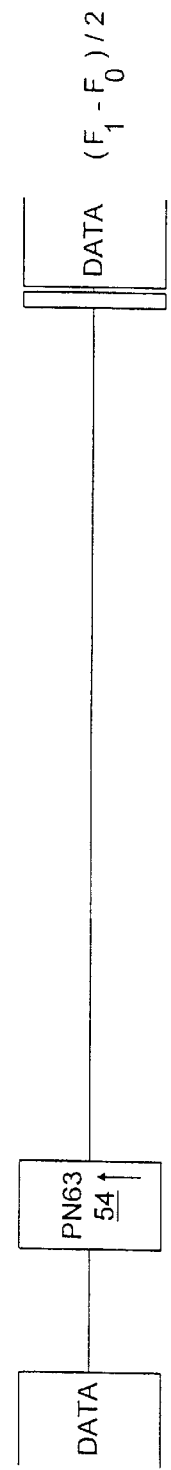
FIG. 2C is a timing diagram of a GCR signal as separated from the DFS signals of FIGS. 2A and 2D by linearly combining corresponding samples from them in a prescribed manner, which GCR signal essentially consists of a PN63 sequence.

FIG. 2C shows the separated GCR signal 54 that ideally results when the DFS signals of fields $F_1$, and $F_2$ of FIGS. 2A and 2B are differentially combined by the computer 14, the combining of the two DFS signals being done on a corresponding samples basis. The separated GCR signal 54 results from the differential combining of the PN63 sequences 34 and 44, which are similar in amplitude but opposite in polarity. The result is ideal in that there is no accompanying noise or ghosting. In practice, the differentially combined DFS signals of several frames are often accumulated, to increase the correlated energy of the GCR signal vis-à-vis the noise energy that is less correlated. If the number of frames the accumulation is carried out over is a multiple of three, the correlated noise arising from the detection of co-channel interfering NTSC signal video modulation close to video carrier and chrominance subcarrier will be reduced in energy. This was disclosed by A. L. R. Limberg in provisional U.S. application Ser. No. 60/097, 609 filed Aug. 24, 1998 and entitled "SUPPRESSION OF CO-CHANNEL NTSC INTERFERENCE ARTIFACTS WHEN ADAPTING FILTER COEFFICIENTS OF DTV RECEIVER EQUALIZER".

The DSS codes 31 and 41 differentially combine to provide a 4-symbol-epoch interval free of signal or direct component. The mode codes 32 and 42 differentially combine to provide a 24-symbol-epoch interval free of signal or direct component. The PN63 sequences 33 and 43 differentially combine to provide a 63-symbol-epoch interval free of signal or direct component. These three intervals combine to provide a total time free of signal or direct component equal to 91 symbol epochs previous to the separated GCR signal 54. So, theoretically pre-ghosts as much as 8.455 microseconds before the principal signal can be detected without data making substantial contribution to background clutter.

The PN63 sequences 35 and 45 differentially combine to provide a 63-symbol-epoch interval free of signal or direct component. The PN511 sequences 36 and 46 differentially combine to provide a 511-symbol-epoch interval free of signal or direct component. These 63-symbol-epoch and 511-symbol-epoch intervals free of signal or direct component interval combine with the 104-symbol-epoch interval free of signal or direct component resulting from the direct components during intervals 46 and 47 being differentially combined, to provide a total time free of signal or direct component equal to 678 symbol epochs following the separated GCR signal 54. So, theoretically post-ghosts up to 62.992 microseconds can be detected without pre-code and continuing data making substantial contribution to background clutter.

In actual practice, pre-ghosts of the pre-code and continuing data can contribute to background clutter, to reduce by as much as six microseconds the practical maximum delay that post-ghosts can have and still be detectable. Also, uncanceled noise in the difference signal containing the separated GCR signal 54 may have sufficient energy that a PN63 match filter may not be able to discriminate against the noise to detect long-delayed post-ghosts, which tend to be low in energy. A good initial stratagem for the computer 14 to follow in canceling ghosts in reliance on the FIG. 2C signal is to cancel post-ghosts beginning with those most delayed within the 40 microsecond or so expected limit on post-ghosts and working back to the post-ghosts with ever decreasing delay. This procedure sweeps back in time the post-ghosts of the uncanceled data, which data precede the PN63 sequences 34 and 44, so these post-ghosts do not overlap the post-ghosts of the separated GCR signal 54 the detection of which is the desideratum. As the less and less delayed post-ghosts are canceled, the interval between the separated GCR signal 54 and the earlier uncanceled data is swept free of post-ghosts. The continuing stratagem for the computer 14 is to cancel pre-ghosts and to equalize the channel to suppress ghosts close in time to the principal signal.

Figure 2D:
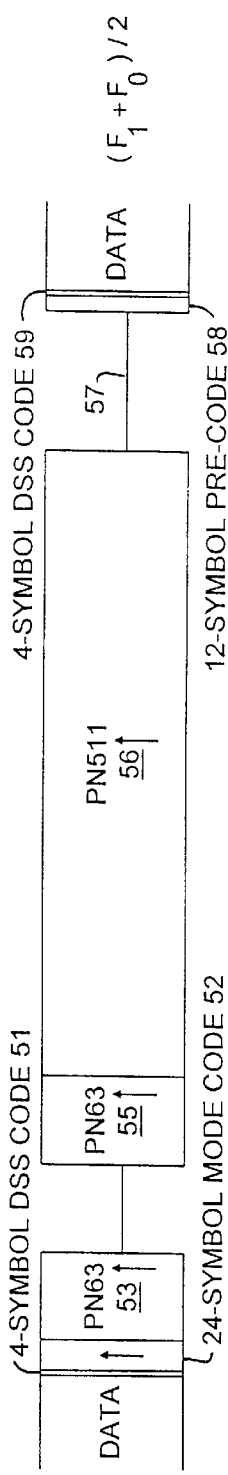
FIG. 2D is a timing diagram of a GCR signal as separated from portions of the DFS signals of FIGS. 2A and 2D by linearly combining corresponding samples from them in a prescribed manner, which GCR signal essentially consists of a PN63 sequence and a subsequent PN511 sequence.

FIG. 2D shows the signal that ideally results when the DFS signals of fields $F_1$ and $F_2$ of FIGS. 2A and 2B are additively combined by the computer 14, the combining of the two DFS signals being done on a corresponding samples basis for mean averaging those DFS signals. Of particular interest are a PN63 sequence 55, which results from the averaging of PN63 sequences 35 and 45, and a PN511 sequence 56, which results from the averaging of PN511 sequences 36 and 46. The PN63 sequence 55 and subsequent PN511 sequence 56 together form a GCR signal suited for the further suppression of less delayed ghosts after macro-ghosts have been initially suppressed. The initial suppression of macro-ghosts is preferably done by the computer 14 being programmed to convolve a PN63 match filter with the separated GCR signal 54 of FIG. 2C and its ghosts, and then to measure peaks in the match filter response for determining the delay and amplitude of the ghosts respective to the principal received signal. These measurements are adapted for use by ghost-canceling filters that use programmable bulk delay in regions of the kernel in which filter coefficients are essentially zero-valued.

After the initial suppression of macro-ghosts, suppression of micro-ghosts is instituted using DFT methods in the computer 14. The DFT of a window extending from a time as much as 63 symbol epochs (5.853 microseconds) before the PN63 sequence 55 to a time as many as 104 symbol epochs (9.662 microseconds) after the PN511 sequence 56 is calculated by the computer 14 and divided by the DFT of the PN63 sequence 55 followed by the PN511 sequence 56 as they would be received without accompanying ghosts, which DFT is known a priori and is supplied from the ROM 15 for training signals. This generates a DFT that characterizes the transmission channel response, which DFT is complemented to generate a DFT that describes the kernel of the requisite channel equalization filter for minimizing intersymbol interference. Non-zero kernel weights are determined or are updated in the regions where bulk delay is not employed. The width of the window embracing the PN63 sequence 55 and the PN511 sequence 56 is an order of magnitude wider than the kernel of a PN63 match filter, which facilitates the detection of ghosts in the presence of increased all-white Gaussian noise.

The 104-symbol-epoch reserve following the PN511 sequences in the signals of FIGS. 2A and 2B could have signal inserted into them without affecting ghost-cancellation or channel equalization appreciably if the signal stayed the same for data fields $F_1$ and $F_2$ and then was repeated in opposite sense of polarity in the next pair of data fields. The inserted signal would cancel in both the signals of FIGS. 2C and 2D as generated during alternate frames.

In a variant of the set of signals shown in FIGS. 2A and 2B, the 24-symbol mode code may be left near the end of each DFS data segment with the triple PN63 sequence starting immediately after the 4-symbol DSS code finishes beginning that DFS data segment. The total time free of signal or direct component before the separated PN63 sequence in the resulting variant of the FIG. 2C signal is shortened to sixty-seven symbol epochs. However, pre-ghosts up to 6.225 microseconds before the principal received signal can be detected without being overlapped by data, which should be sufficient. The total time free of signal or direct component after the separated PN63 sequence is lengthened to 741 symbol epochs, so post-ghosts delayed up to 68.845 microseconds can be detected without being overlapped by pre-code and continuing data.

FIGS. 3A and 3B are timing diagrams of alternative modifications of the DFS signals accompanying ATSC DTV transmissions, the fields of which DTV transmissions are consecutively numbered modulo-2. These timing diagrams and that of FIG. 3C share a common time scale. The FIG. 3A DFS signal differs from the FIG. 2A DFS signal in that the PN63 sequence 35 that repeats the immediately preceding PN63 sequence 34 is replaced by a PN63 sequence 135 which is orthogonal to the PN63 sequence 34. A PN63 sequence 135 which is in reverse time order from the PN63 sequence 34 is orthogonal thereto. The FIG. 3B DFS signal differs from the FIG. 2B DFS signal in that the PN63 sequence 45 that is similar to the PN63 sequence 34 is replaced by a PN63 sequence 145 that is similar to the PN63 sequence 135 in amplitude but is opposite thereto in sense of polarity.

FIG. 3C shows the separated GCR signal comprising components 54 and 155 that ideally results when the DFS signals of fields $F_1$ and $F_2$ of FIGS. 3A and 3B are differentially combined by the computer 14, the combining of the two DFS signals being done on a corresponding samples basis. As in the FIG. 2C signal the component 54 of separated GCR signal results from the differential combining of the PN63 sequences 34 and 44, which are similar in amplitude but opposite in polarity. A subsequent further component 155 of separated GCR signal results from the differential combining of the PN63 sequences 135 and 145, which are similar in amplitude but opposite in polarity.

A match filter with a kernel similar to the consecutive separated PN63 sequences 54 and 155 provides twice the sensitivity that a PN63 match filter has for detecting ghosts of the GCR signal. So the presence of noise will have less impact on ghost cancellation. GCR signal can be accumulated over fewer frames while still reducing noise to low enough level to permit detection of ghosts with more than a prescribed energy level. This helps the ghost cancellation circuitry to track changing multipath conditions.

The total time free of signal or direct component after the GCR signal is shortened by sixty-three symbol epochs to 615 symbol epochs. So, theoretically post-ghosts up to 57.139 microseconds can be detected without pre-code and continuing data making substantial contribution to background clutter. This is still longer than the maximum expected delay for a ghost having substantial energy.

FIG. 3D shows the signal that ideally results when the DFS signals of fields $F_1$ and $F_2$ of FIGS. 3A and 3B are additively combined by the computer 14, the combining of the two DFS signals being done on a corresponding samples basis for mean averaging those DFS signals. Of particular interest is the PN511 sequence 56, which results from the averaging of PN511 sequences 36 and 46. The PN511 sequence 56 provides a GCR signal suited for the further suppression of less delayed ghosts after macro-ghosts have been initially suppressed. The initial suppression of macro-ghosts is preferably done by the computer 14 being programmed to convolve a match filter with the separated GCR signal comprising the sequential PN63 sequences 54 and 55 of FIG. 3C and their ghosts, and then to measure peaks in the match filter response for determining the delay and amplitude of the ghosts respective to the principal received signal. These measurements are adapted for use by ghost-canceling filters that use programmable bulk delay in regions of the kernel in which filter coefficients are essentially zero-valued.

After the initial suppression of macro-ghosts, suppression of micro-ghosts is instituted using DFT methods in the computer 14. The DFT of a window extending from a time as much as 126 symbol epochs (11.706 microseconds) before the PN511 sequence 56 to a time as many as 104 symbol epochs (9.662 microseconds) after the PN511 sequence 56 is calculated by the computer 14 and divided by the DFT of the PN63 sequence 55 followed by the PN511 sequence 56 as they would be received without accompanying ghosts, which DFT is known a priori and is supplied from the ROM 15 for training signals. This generates a DFT that characterizes the transmission channel response, which DFT is complemented to generate a DFT that describes the kernel of the requisite channel equalization filter for minimizing intersymbol interference. Non-zero kernel weights are determined or are updated in the regions where bulk delay is not employed. The width of the window embracing the PN511 sequence 56 is an order of magnitude wider than the kernel of a PN63 match filter, which facilitates the detection of ghosts in the presence of increased all-white Gaussian noise.

The 104-symbol-epoch reserve following the PN511 sequences in the signals of FIGS. 3A and 3B could have signal inserted into them without affecting ghost-cancellation or channel equalization appreciably if the signal stayed the same for data fields $F_1$ and $F_2$ and then was repeated in opposite sense of polarity in the next pair of data fields. The inserted signal would cancel in both the signals of FIGS. 3C and 3D as generated during alternate frames.

In a variant of the set of signals shown in FIGS. 3A and 3B, the 24-symbol mode code may be left near the end of each DFS data segment with the triple PN63 sequence starting immediately after the 4-symbol DSS code finishes beginning that DFS data segment. The total time free of signal or direct component before the separated PN63 sequence in the resulting variant of the FIG. 3C signal is shortened to sixty-seven symbol epochs, so pre-ghosts up to 6.225 microseconds before the principal received signal can be detected without being overlapped by data. The total time free of signal or direct component after the separated PN63 sequence is lengthened to 678 symbol epochs, so post-ghosts delayed up to 62.992 microseconds can be detected without being overlapped by pre-code and continuing data. FIG. 2D and 3D also show a 4-symbol data segment synchronization (DSS) code 51, a 24-symbol mode code 52, a PN63 sequence 53, a 104-symbol-epoch interval 57, a 12-symbol precode group 58, and a 4-symbol DSS code 59.

The inventors observe that the programming of the computer 14 for calculating the weighting coefficients of the filter circuitry 9 could be simplified if the GCR signals used in NTSC analog television were more similar to those used in ATSC digital television.

FIGS. 4A, 4B, 4C and 4D are timing diagrams of proposed vertical-blanking-interval (VBI) signals for NTSC analog TV transmissions, the fields of which NTSC analog TV transmissions are consecutively numbered modulo-4. These timing diagrams and that of FIGS. 4E share a common modular time. The VBI signals of FIGS. 4A, 4B, 4C and 4D are inserted into successive fields $F_1'$, $F_2'$, $F_3'$ and $F_0'$, respectively. These VBI signals may comprise any one of the $11^{th}$ through $20^{th}$ scan lines of each field, the present preference being to insert them into the $19^{th}$ scan line of each field, numbering the scan lines consecutively with the first line occurring after the close of active scan in the preceding field. The insertion of the VBI signals into the $19^{th}$ scan line of each field is presumed in the description which follows.

The $19^{th}$ scan lines of FIGS. 4A, 4B, 4C and 4D begin with horizontal synchronization pulses 61, 71, 81 and 91, respectively, which pulses are depicted as being negative-going. The horizontal synchronization pulses 61, 71, 81 and 91 are respectively followed during ensuing back-porch intervals by chroma bursts 62, 72, 82 and 92. The plus and minus signs near the chroma bursts 62, 72, 82 and 92 indicate their relative polarities respective to each other, per the NTSC standard. The leading edges of the horizontal synchronization pulses 61, 71, 81 and 91 are considered to be the beginning of the vertical-blanking-interval horizontal scan lines, which lines are each of 63.55 microsecond duration in NTSC standard signals. This 63.55 microsecond duration corresponds to substantially 684 symbol periods of ATSC DTV signal and approximately 113 of these symbol periods are taken up by the horizontal synchronization pulse and its flanking porches.

The 571 symbol period between each back porch and the ensuing front porch is of sufficient duration to accommodate a pedestal extending for the 189 symbol periods taken up by three PN63 sequences and having 6-symbol-epoch rise and fall times. The current preference is for the PN sequences accompanying NTSC analog TV signals to have −1 and +1 values at −15 IRE and +95 IRE levels, respectively. This provides these sequences with substantial energy to improve the identification of weaker ghosts, while avoiding some of the non-linearities that may be associated with very high or very low levels of modulation. The FIG. 4A VBI scan line has three consecutive PN63 sequences 63, 64 and 65 on a pedestal 66, the PN63 sequences 64 and 65 replicating the PN63 sequence 64. The FIG. 4B VBI scan line has three consecutive PN63 sequences 73, 74 and 75 on a pedestal 76, the PN63 sequences 73 and 74 and 75 replicating the PN63 sequences 63 and 64 and 65 of FIG. 4A. The FIG. 4C VBI scan line has three consecutive PN63 sequences 83, 84 and 85 on a pedestal 86, the PN63 sequences 83 and 85 replicating the PN63 sequences 73 and 75 of FIG. 4B. The PN sequence 84 of FIG. 4C has the same amplitude as the PN sequence 74 of FIG. 4B but has the opposite sense of polarity. The FIG. 4D VBI scan line has three consecutive PN63 sequences 93, 94 and 95 on a pedestal 96, the PN63 sequences 93 and 94 and 95 replicating the PN63 sequences 83 and 84 and 85 of FIG. 4C. The pedestals 66, 76, 86 and 96 in fields $F_1'$, $F_2'$, $F_3'$ and $F_0'$ each have a value of +40 IRE levels and transitions to this level from the porches at 0 IRE levels can be made as rapidly as the 40-IRE-level transitions of horizontal sync pulse edges, which take less than 0.254 microsecond. There are no bandwidth constraints, then, to prevent the pedestal transitions each to be made within six ATSC symbol epochs, or 0.557 microsecond.

The $19^{th}$ scan lines of FIGS. 4A, 4B, 4C and 4D end when the front porches for the horizontal synchronization pulses 67, 77, 87 and 97, respectively, of the ensuing $20^{th}$ scan lines begin. The horizontal synchronization pulses 67, 77, 87 and 97 are respectively followed during ensuing back-porch intervals by chroma bursts 68, 78, 88 and 98 of those $20^{th}$ scan lines.

Figure 4A:
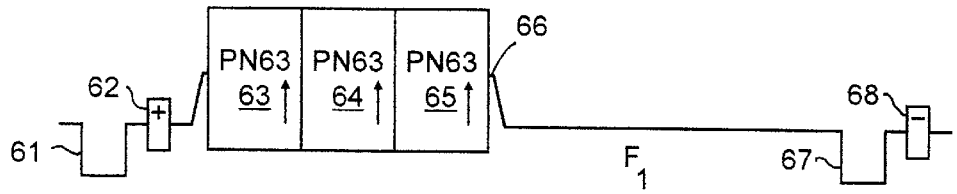
FIGS. 4A, 4B, 4C and 4D are timing diagrams of signals proposed in accordance with an aspect of the invention for accompanying NTSC analog TV transmissions, the fields of which NTSC analog TV transmissions are consecutively numbered modulo-4.
Figure 4B:
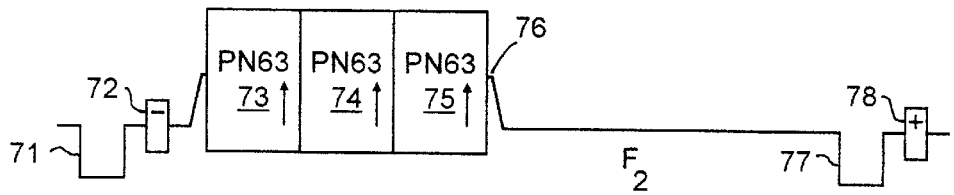
Figure 4C:
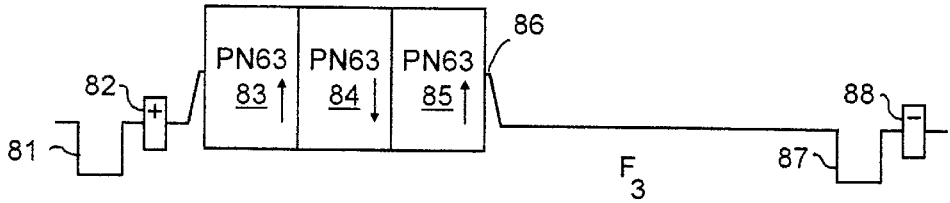
Figure 4D:
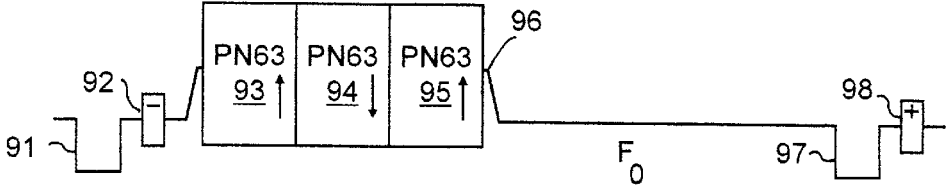
Figure 4E:
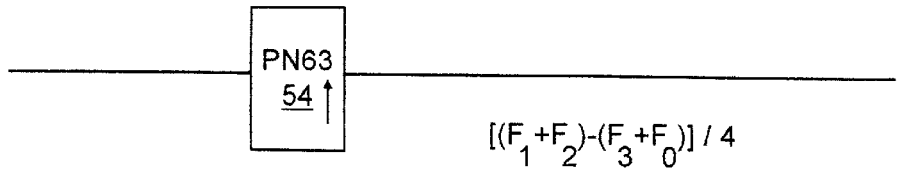
FIG. 4E is a timing diagram of a GCR signal as separated from the signals of FIGS. 4A, 4B, 4C and 4D by linearly combining corresponding samples from them in a prescribed manner, which GCR signal essentially consists of a PN63 sequence.

FIG. 4E shows the separated GCR signal 54 that results when the GCR signals from two successive fields that are in two successive frames of NTSC analog TV signal are differentially combined, assuming that the GCR signals are of the sort shown in FIGS. 4A, 4B, 4C and 4D. A separated GCR signal per FIG. 4E results when the sum of the GCR signals of fields $F_1'$ and $F_2'$ of FIGS. 4A and 4B is differentially combined with the sum of fields $F_3'$ and $F_0'$ of FIGS. 4C and 4D, the combinings being done on a corresponding samples basis. The horizontal synchronizing pulses, their porches and the chroma bursts, as well as the second component GCR signal, are suppressed in the separated GCR signal of FIG. 4E.

Supposing the initial PN63 sequences 63, 73, 83 and 93 to begin 125 symbol epochs after the beginning of the VBI scan line, the separated GCR signal 54 will begin 188 symbol epochs after the start of the horizontal scan line and will end 251 symbol epochs after the start of the horizontal scan line. Pre-ghosts up to 17.467 microseconds (188 symbol epochs) before the principal received signal can be detected from the FIG. 4E signal without being overlapped by signal from the preceding VBI scan line. Post-ghosts delayed up to 50.728 microseconds (546 symbol epochs) after the principal received signal can be detected from the FIG. 4E signal without being overlapped by signal following the back porch in the succeeding VBI scan line.

In variants of the set of signals shown in FIGS. 4A, 4B, 4C and 4D, the PN63 sequences 63, 73, 83 and 93 are dispensed with wholly or in part and the PN63 sequences 64, 74, 84 and 94 and the ensuing PN63 sequences 65, 75, 85 and 95 are moved ahead in time. This advances the separated GCR signal 54 in time, decreasing pre-ghost detection capability in favor of increasing post-ghost detection capability.

A PN sequence does not have a uniform-amplitude frequency spectrum. Its frequency spectrum is comb-like in nature, which does not affect macro-ghost cancellation but may affect micro-ghost cancellation. A PN sequence and the PN sequence in reverse order are orthogonal to each other and combine to provide a frequency spectrum that is quite uniform in amplitude up to a roll-off frequency and is preferable as a training signal for channel equalization in an analog television receiver.

Figure 5A:
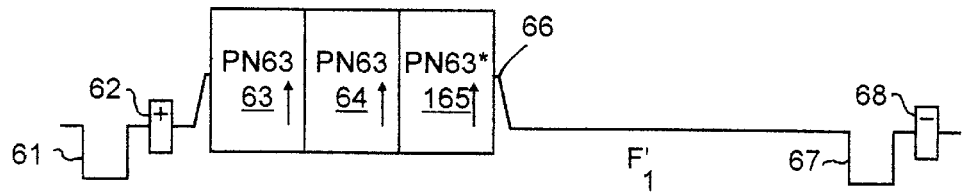
FIGS. 5A, 5B, 5C and 5D are timing diagrams of signals proposed in accordance with an aspect of the invention for accompanying NTSC analog TV transmissions, the fields of which NTSC analog TV transmissions are consecutively numbered modulo-4.
Figure 5B:
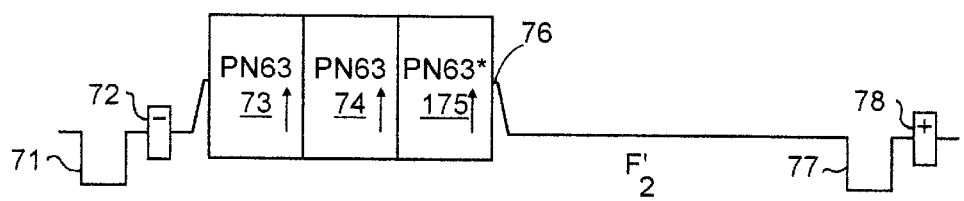
Figure 5C:
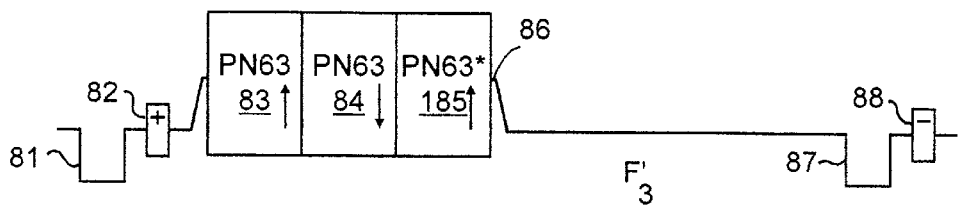
Figure 5D:
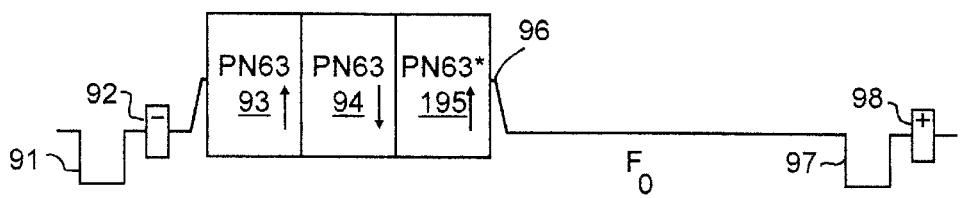

FIGS. 5A, 5B, 5C and 5D are timing diagrams of proposed vertical-blanking-interval (VBI) signals for NTSC analog TV transmissions, differing from those of FIGS. 4A, 4B, 4C and 4D in that the final PN63 sequences 165, 175, 185 and 195 do not replicate the initial PN63 sequences 63, 73, 83 and 93. The final PN63 sequences 165, 175, 185 and 195 are orthogonal to the initial PN63 sequences 63, 73, 83 and 93, being the reverses of the initial PN63 sequences 63, 73, 83 and 93 or being cyclical rotations of such reverse sequences. The final PN63 sequence 175 of field $F_2'$ in FIG. 5B replicates the final PN63 sequence 165 of field $F_1'$ in FIG. 5A; and the final PN63 sequence 195 of field $F_0'$ in FIG. 5D replicates the final PN63 sequence 185 of field $F_3'$ in FIG. 5C. However, while the same in amplitude as the final PN63 sequence 175 of field $F_2'$ in FIG. 5B, the final PN63 sequence 185 of field $F_3'$ in FIG. 5C is opposite in sense of polarity.

Figure 5E:
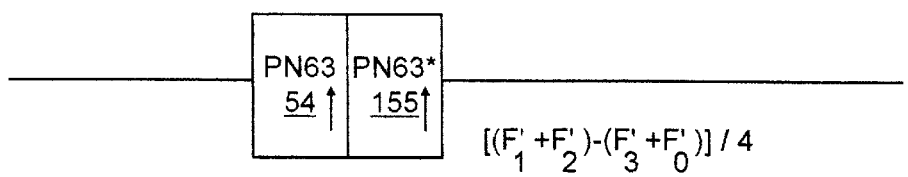
FIG. 5E is a timing diagram of a GCR signal as separated from the signals of FIGS. 5A, 5B, 5C and 5D by linearly combining corresponding samples from them in a prescribed manner, which GCR signal essentially consists of two PN63 sequences that are mutually orthogonal to each other.

FIG. 5E shows the separated GCR signal comprising the PN sequence 54 and the subsequent PN sequence 155 orthogonal thereto that results when the GCR signals from two successive fields that are in two successive frames of NTSC analog TV signal are differentially combined, assuming that the GCR signals are of the sort shown in FIGS. 5A, 5B, 5C and 5D. A separated GCR signal per FIG. 5E results when the sum of the GCR signals of fields $F_{1' \text{ and } F_2'}$ of FIGS. 5A and 5B is differentially combined with the sum of fields $F_3'$ and $F_0'$ of FIGS. 5C and 5D, the combinings being done on a corresponding samples basis. The horizontal synchronizing pulses, their porches and the chroma bursts, as well as the second component GCR signal, are suppressed in the separated GCR signal of FIG. 5E.

Supposing the separated GCR signal 54 and 155 to begin 188 symbol epochs after the start of the horizontal scan line, pre-ghosts as far advanced as 17.467 microseconds can still be detected from the FIG. 5E signal without being overlapped by signal from the preceding VBI scan line. Supposing the separated GCR signal 54 and 155 to finish 314 symbol epochs after the start of the horizontal scan line, post-ghosts delayed as much as 44.874 microseconds (684−314+113=483 symbol epochs) can be detected from the FIG. 5E signal without being overlapped by signal following the back porch in the succeeding VBI scan line.

In variants of the set of signals shown in FIGS. 5A, 5B, 5C and 5D, the PN63 sequences 63, 73, 83 and 93 are dispensed with wholly or in part; and the PN63 sequences 64, 74, 84 and 94 and the ensuing PN63 sequences 165, 175, 185 and 195 are moved ahead in time. This advances the separated GCR signal 54 and 155 in time, decreasing pre-ghost detection capability in favor of increasing post-ghost detection capability.

Acquaintance with the foregoing disclosure will make a number of other embodiments of the invention clear to one skilled in the art, and the scopes of the broader claims that follow this specification should be construed accordingly. In the claims which follow the word "said" is used to indicate antecedence rather than the word "the", which is used for other grammatical purposes.

What is claimed is:

1. An electrical signal received by a television signal receiver, which is of a type for receiving digital television signals and has adaptive channel equalization and ghost cancellation filter circuitry that can be trained responsive to a ghost cancellation reference signal, said electrical signal divided into segments having respective initial synchronizing signal portions, said segments being grouped into fields, most of the segments of each field being available for transmitting television information, with a single segment of each field being reserved for other purposes including transmission of said ghost cancellation reference signal, said electrical signal being improved to include a respective plurality of pseudo-random noise sequences within the first half of said reserved segment of each field, at least one of which respective plurality of pseudo-random noise sequences appears in different polarities in different fields for being included in said ghost cancellation reference signal after being separated from other information in said reserved segment of each field by algebraically combining elements of that segment with corresponding elements of at least one other reserved segment from another field.

2. The electrical signal of claim 1, wherein digital television information is transmitted to said television signal receiver.

3. The electrical signal of claim 2, wherein said ghost cancellation reference signal consists of a single pseudo-random noise sequence.

4. The electrical signal of claim 3, wherein said single pseudo-random noise sequence is a PN63 sequence alternating its sense of polarity from field to field.

5. The electrical signal of claim 2, wherein said ghost cancellation reference signal alternates in sense of polarity from field to field, and wherein said ghost cancellation reference signal consists of two consecutive pseudo-random noise sequences of similar duration which are orthogonal to each other.

6. The electrical signal of claim 5, wherein said ghost cancellation reference signal consists of two consecutive PN63 sequences.

7. The electrical signal of claim 1, wherein said electrical signal is received by said television signal receiver that is of a type for receiving analog television signals as well as digital television signals, said electrical signal being composed of consecutive frames each consisting of a pair of consecutive ones of said fields, said electrical signal mapping horizontal scanning lines of an image into most of the segments of each said frame, with the respective initial synchronizing signal portions of the segments of each field including a horizontal synchronizing pulse.

8. The electrical signal of claim 7, wherein said ghost cancellation reference signal consists of a single pseudo-random noise sequence.

9. The electrical signal of claim 8, wherein said single pseudo-random noise sequence is a PN63 sequence alternating its sense of polarity from field to field.

10. The electrical signal of claim 7, wherein said ghost cancellation reference signal alternates in sense of polarity from field to field, and wherein said ghost cancellation reference signal consists of two consecutive pseudo-random noise sequences of similar duration which are orthogonal to each other.

11. The electrical signal of claim 10, wherein said ghost cancellation reference signal consists of two consecutive PN63 sequences.

12. An electrical signal received by a television signal receiver, which is of a type for receiving digital television signals and has adaptive channel equalization and ghost cancellation filter circuitry that can be trained responsive to a ghost cancellation reference signal, said electrical signal divided into segments having respective initial synchronizing signal portions, said segments being grouped into fields, most of the segments of each field being used for transmitting digital television information, with a single segment of each field being reserved for other purposes including transmission of said ghost cancellation reference signal, said electrical signal being improved to include a respective pair of pseudo-random noise sequences within said reserved segment of each field, said pseudo-random noise sequences in each pair being orthogonal respective to each other, at least one of which said pseudo-random noise sequences in each respective pair of pseudo-random noise sequences appears in different polarities in different fields for being included in said ghost cancellation reference signal after being separated from other information in said reserved segment of each field by algebraically combining elements of that segment with corresponding elements of at least one other reserved segment from another field.

13. The electrical signal of claim 12, wherein said pseudo-random noise sequences in each respective pair of pseudo-random noise sequences are PN63 sequences.

14. The electrical signal of claim 13, wherein the latter one of said pseudo-random noise sequences in each respective pair of pseudo-random noise sequences is the reverse of the earlier one of said pseudo-random noise sequences in each respective pair of pseudo-random noise sequences.

15. The electrical signal of claim 12, wherein the latter one of said pseudo-random noise sequences in each respective pair of pseudo-random noise sequences is the reverse of the earlier one of said pseudo-random noise sequences in each respective pair of pseudo-random noise sequences.

* * * * *